United States Patent
Shah et al.

(10) Patent No.: US 12,282,997 B2
(45) Date of Patent: Apr. 22, 2025

(54) GENERATING SIMULATION SCENARIOS AND DIGITAL MEDIA USING DIGITAL TWINS

(71) Applicant: Duality Robotics, Inc., San Mateo, CA (US)

(72) Inventors: Apurva Shah, San Mateo, CA (US); Thomas Henry, Libertyville, IL (US)

(73) Assignee: DUALITY ROBOTICS, INC., San Mateo, CA (US)

( * ) Notice: Subject to any disclaimer, the term of this patent is extended or adjusted under 35 U.S.C. 154(b) by 252 days.

(21) Appl. No.: 18/134,255

(22) Filed: Apr. 13, 2023

(65) Prior Publication Data

US 2023/0334773 A1    Oct. 19, 2023

Related U.S. Application Data

(60) Provisional application No. 63/330,755, filed on Apr. 13, 2022.

(51) Int. Cl.
*G06T 17/00* (2006.01)
*G06Q 30/0241* (2023.01)

(52) U.S. Cl.
CPC ......... *G06T 17/00* (2013.01); *G06Q 30/0277* (2013.01)

(58) Field of Classification Search
CPC . G06T 17/00; G06T 19/20; G06T 2219/2024; G06T 13/40; G06Q 30/0277
See application file for complete search history.

(56) References Cited

U.S. PATENT DOCUMENTS

| | | | | |
|---|---|---|---|---|
| 2019/0138333 | A1* | 5/2019 | Deutsch | G06Q 10/0631 |
| 2020/0394351 | A1* | 12/2020 | Roemerman | G06F 30/27 |
| 2022/0366626 | A1* | 11/2022 | Miller, IV | G06F 17/18 |
| 2023/0009454 | A1* | 1/2023 | Paciello | A63F 13/57 |
| 2023/0080379 | A1* | 3/2023 | Rider | G06N 20/00 |
| | | | | 706/12 |

* cited by examiner

*Primary Examiner* — Maurice L. McDowell, Jr.
(74) *Attorney, Agent, or Firm* — Trellis IP Law Group, PC

(57) ABSTRACT

A computer-implemented method includes receiving a request for generating a simulation scenario or digital media that includes one or more entities and one or more assets in an environment, the request including contextual information. The method further includes selecting three-dimensional (3D) digital twins based on the contextual information, wherein one or more of the 3D digital twins correspond to the assets, one or more of the 3D digital twins correspond to the one or more entities, and one of the 3D digital twins corresponds to the environment. The method further includes generating the simulation scenario that initializes the 3D digital twins and establishes a spatial relationship between the 3D digital twins based on the contextual information. The method further includes controlling behavior of the 3D digital twins in the simulation scenario based on the contextual information.

20 Claims, 6 Drawing Sheets

600

Receive a request for generating a simulation scenario or digital media that includes one or more entities and one or more assets in an environment, the request including context information 602

Select 3D digital twins based on the contextual information, where one or more of the 3D digital twins correspond to the assets, one or more of the digital twins correspond to the one or more entities, and one of the 3D digital twins corresponds to the environment 604

Generate the simulation scenario that initializes the 3D digital twins and establishes a spatial relationship between the 3D digital twins based on the contextual information 606

Controlling behavior of the 3D digital twins in the simulation scenario based on the contextual information 608

FIG 6

GENERATING SIMULATION SCENARIOS AND DIGITAL MEDIA USING DIGITAL TWINS

CROSS REFERENCES TO RELATED APPLICATIONS

This application is related to U.S. Provisional Patent Application Ser. No. 63/330,755 entitled "Real Time Personalized Visual Advertising with Digital Twins," and filed Apr. 13, 2022, the entirety of which is incorporated by reference as if set forth in full in this application for all purposes.

BACKGROUND

1. Field of the Invention

This description generally relates to generating simulation scenarios using three-dimensional (3D) digital twins, and more specifically to combining 3D digital twins of environments, entities, and assets based on contextual information in a request.

2. Description of the Related Art

Media is used for a variety of reasons. For example, web clients may request a digital advertisement for display on a webpage. The digital advertisement is retrieved from a stock of images. The advertisements may be different depending on the location of the web client, such as using local ads during a television break. However, the advertisements are designed to have broad appeal since they are received by a large audience. This media is captured in advance of its intended use.

The media is typically captured in a scenario. The scenario takes place within an environment, which can be a physical location or created within a studio environment. Capture sensors are placed within this environment, such as a camera but also including light detection and ranging (LiDAR), light field capture, etc. In addition, the scenario can also contain one or more human or system entities, and physical assets arranged per specified initial conditions and tasked with scripted behaviors and specific constraints that guide their performance during the media capture from the sensors. This is often referred to in the media profession as a photo or video shoot.

As media has become more digitized, images of assets can be used to create a scenario. However, a designer has traditionally illustrated the scenario. Recent advancements in machine-learning models have resulted in being able to use descriptions to create a particular scenario. However, the scenarios include unrealistic components, such as people having misshapen fingertips or objects being combined in inaccurate ways because the machine-learning model merely combines images from training datasets without understanding how objects in a scenario interact with each other.

SUMMARY

According to one aspect, a computer-implemented method includes receiving a request for generating a simulation scenario or digital media that includes one or more entities and one or more assets in an environment, the request including contextual information. The method further includes selecting three-dimensional (3D) digital twins based on the contextual information, wherein one or more of the 3D digital twins correspond to the assets, one or more of the 3D digital twins correspond to the one or more entities, and one of the 3D digital twins corresponds to the environment. The method further includes generating the simulation scenario that initializes the 3D digital twins and establishes a spatial relationship between the 3D digital twins based on the contextual information. The method further includes controlling behavior of the 3D digital twins in the simulation scenario based on the contextual information.

In some embodiments, the method further includes generating, with one or more virtual sensors, the digital media based on the simulation scenario. In some embodiments, the method further includes providing the digital media and style reference media as input to a style transfer machine-learning model and outputting, with the style transfer machine-learning model, stylized digital media that reflects the digital media in a style of the style reference media. In some embodiments, the assets are products, the digital media is a digital media advertisement, and the method further includes providing a link of the digital media advertisement to a web client. In some embodiments, the digital media is delivered in real time via a hypertext transfer protocol secure (HTTPS) media request. In some embodiments, the request includes a scripted prompt that describes the contextual information and the method further includes providing the scripted prompt as input to a large language model (LLM) and outputting, with the LLM, the simulation scenario based on the contextual information in the scripted prompt. In some embodiments, the method further includes providing the simulated scenario as synthetic training set data to a machine-learning model and training the machine-learning model based on the training set data to output additional simulated scenarios based on receiving other contextual information as input. In some embodiments, the request for generating the simulation scenario is for testing a robotic system and the simulation scenario includes a corresponding digital twin of the robotic system in the digital twin of the environment that predicts behavior of the robotic system in a real-world environment. In some embodiments, the robotic system is an autonomous system and the contextual information includes sensor data of a real-world event that occurred involving the autonomous system. In some embodiments, the simulation scenario includes multiple robotics systems, human operated systems, and simulated entities in a coordinated workflow or process.

According to one aspect, a device includes a processor and a memory coupled to the processor, with instructions stored thereon that, when executed by the processor, cause the processor to perform operations comprising: receiving a request for generating a simulation scenario or digital media that includes one or more entities and one or more assets in an environment, the request including contextual information, selecting 3D digital twins based on the contextual information, wherein one or more of the 3D digital twins correspond to the assets, one or more of the 3D digital twins correspond to the one or more entities, and one of the 3D digital twins corresponds to the environment, generating the simulation scenario that initializes the 3D digital twins and establishes a spatial relationship between the 3D digital twins based on the contextual information, and controlling behavior of the 3D digital twins in the simulation scenario based on the contextual information.

In some embodiments, the operations further include generating, with one or more virtual sensors, the digital media based on the simulation scenario. In some embodiments, the operations further includes providing the digital media and style reference media as input to a style transfer machine-learning model and outputting, with the style transfer machine-learning model, stylized digital media that reflects the digital media in a style of the style reference media. In some embodiments, the assets are products, the digital media is a digital media advertisement, and the operations further include providing a link of the digital media advertisement to a web client. In some embodiments, the digital media is delivered in real time via a HTTPS media request.

According to one aspect, non-transitory computer-readable medium with instructions stored thereon that, when executed by one or more computers, cause the one or more computers to perform operations, the operations comprising: receiving a request for generating a simulation scenario or digital media that includes one or more entities and one or more assets in an environment, the request including contextual information, selecting 3D digital twins based on the contextual information, wherein one or more of the 3D digital twins correspond to the assets, one or more of the 3D digital twins correspond to the one or more entities, and one of the 3D digital twins corresponds to the environment, generating the simulation scenario that initializes the 3D digital twins and establishes a spatial relationship between the 3D digital twins based on the contextual information, and controlling behavior of the 3D digital twins in the simulation scenario based on the contextual information.

In some embodiments, the operations further include generating, with one or more virtual sensors, the digital media based on the simulation scenario. In some embodiments, the operations further includes providing the digital media and style reference media as input to a style transfer machine-learning model and outputting, with the style transfer machine-learning model, stylized digital media that reflects the digital media in a style of the style reference media. In some embodiments, the assets are products, the digital media is a digital media advertisement, and the operations further include providing a link of the digital media advertisement to a web client. In some embodiments, the digital media is delivered in real time via a HTTPS media request.

The technology described below advantageously generates media in real-time based on contextual information. As a result, the media is more relevant to its intended purpose than selecting static media from a database.

BRIEF DESCRIPTION OF THE DRAWINGS

FIG. 6 is an example flow diagram of a method to generate a simulation scenario according to some embodiments described herein.

DETAILED DESCRIPTION

A digital twin is a digital version of a physical object, process, service, or environment that behaves and looks like its counterpart in the real world. For example, a digital twin of a car is a digital replica of the car in the physical world. A digital twin is a data representation of a physical asset/process counterpart. It is a building block for simulation and is therefore capable of expressing virtual behaviors and generating virtual data that is interchangeable with its physical counterpart. For example, the digital twin may predict the physical properties of the digital replica such that the digital twin simulates how the car reacts to having a car door opened, how a bag of chips would react to having a hand grasp the bag of chips, how a ball would bounce if a person threw the ball, etc.

Network Environment 100

Figure 1:
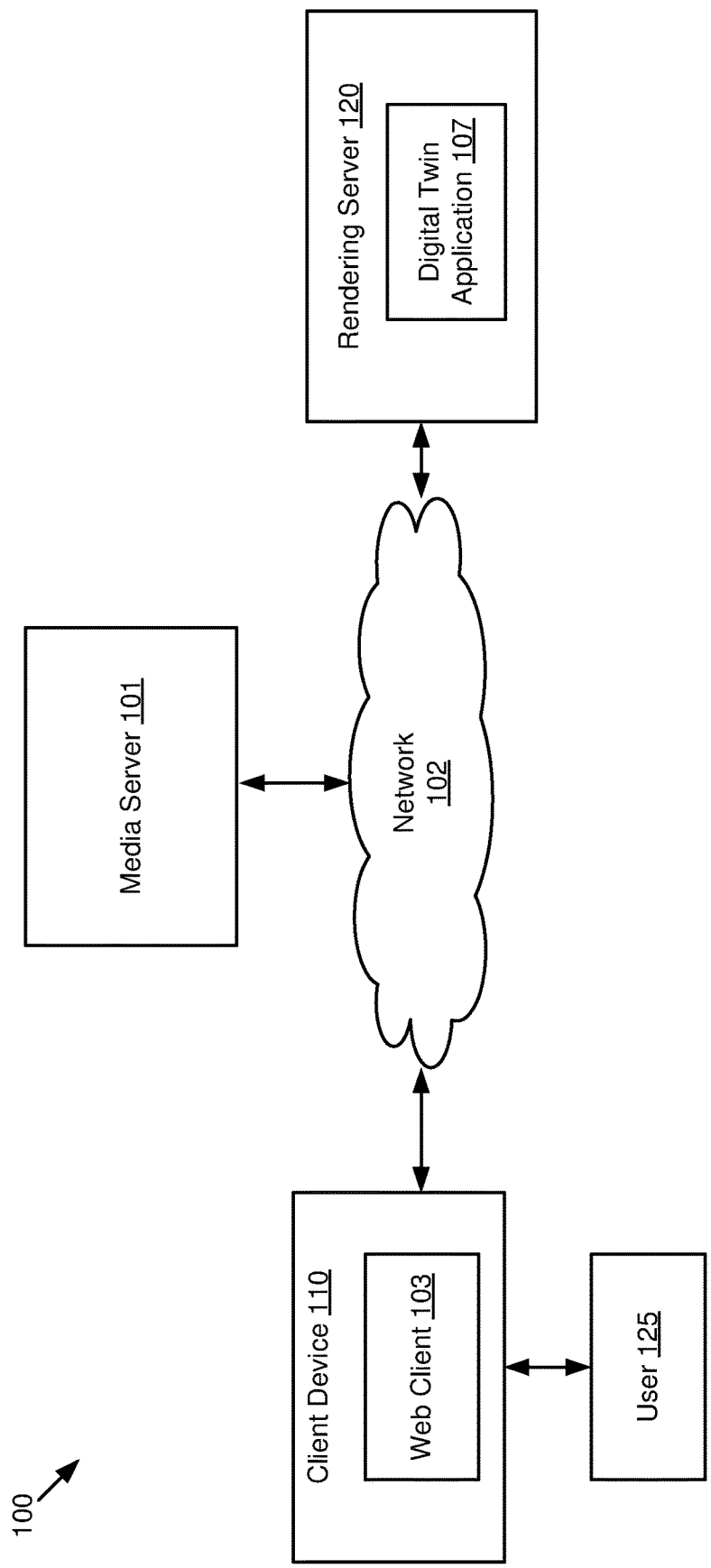
FIG. 1 is a block diagram of an example network environment to generate a simulation scenario, according to some embodiments described herein.

FIG. 1 illustrates a block diagram of an example environment 100 to generate a simulation scenario. In some embodiments, the environment 100 includes a client device 110, a media server 101, a rendering server 120, and a network 102. A user 125 may be associated with the client device 110.

The client device 110 may be a computing device that includes a memory and a hardware processor. For example, the client device 110 may include a mobile device, a tablet computer, a desktop computer, a mobile telephone, a wearable device, a head-mounted display, a mobile email device, a portable game player, a portable music player, or another electronic device capable of accessing a network 102.

In some embodiments, the client device 110 includes a web client 103. A web client 103 is a client-side application used for connecting to the media server 101 over Hypertext Transfer Protocol Secure (HTTPS). In some embodiments, the web client 103 is a browser. In some embodiments, the client device 110 includes a digital twin application, such as the digital twin application 107 discussed below that is stored on the rendering server 120.

The web client 103 requests a simulation scenario or digital media from the media server 101 and/or directly from the rendering server 120. In some embodiments, the user may be browsing a website and the web client 103 requests media for the website, such as media that advertises a product or media that helps showcase an asset in a scenario that is appealing to a user. For example, the website may be for a company that sells home décor and the media may show how a particular product would look in a home similar to the user's or to people that live in the same area as the user. In another example, the website may be associated with an educational institution and the web client 103 requests media that is a video that is generated to help illustrate an educational concept. In yet another example, the web client 103 may request a simulation scenario of a drone flying over the Sedona area at high noon in order to inspect solar panels on a hill.

The media server 101 includes one or more servers that each include a processor, a memory, and network communication hardware. In some embodiments, the media server 101 is a hardware server. The media server 101 is communicatively coupled to the network 102. In some embodiments, the media server 101 sends and receives data to and from the client device 110 and the rendering server 120.

In some embodiments, the media server 101 receives a request for a simulation scenario or digital media that includes one or more entities and one or more assets in an environment. For example, the request may be an HTTPS request, such as a GET request. The request may include contextual information, such as an asset identifier that corresponds to the asset or a three-dimensional (3D) digital twin. For example, the request may include a request for digital media that includes a particular product or a particular illustration of a scientific concept. The media server 101 transmits a packet that includes the asset identifier to the rendering server 120.

The rendering server 120 includes one or more servers that each include a processor, a memory, and network communication hardware. In some embodiments, the rendering server 120 is a hardware server. The rendering server 120 is communicatively coupled to the network 102. In some embodiments, the rendering server 120 receives a packet from the media server 101 that includes the asset identifier and generates media that includes a 3D digital twin that corresponds to the asset identifier included in the request.

In some embodiments, the rendering server 120 includes a digital twin application 107 that selects the digital twins based on the contextual information. The contextual information may be metadata associated with the request (e.g., location of the request, time of day of the request, date of the request, holiday or event that corresponds to the date of the request, etc.), user preferences (e.g., preference for types of products, styles of simulation scenario, etc.), an asset identifier, the type of asset, a scripted prompt (e.g., human understandable text describing a scenario), etc. One or more of the 3D digital twins correspond to the assets, one or more of the 3D digital twins correspond to the one or more entities, and one of the 3D digital twins corresponds to the environment. In some embodiments, the one or more 3D digital twins that correspond to the assets are retrieved based on asset identifiers that are part of the request.

The digital twin application 107 generates the simulation scenario that initializes the 3D digital twins and establishes a spatial relationship between the 3D digital twins based on the contextual information. For example, where the contextual information includes a description of a room with entities and assets inside the room, the digital twin application 107 determines how the entities and assets spatially relate to each other, such as that a bottle of ketchup belongs on a table. In another example, if the asset is a couch, the simulation scenario may include a placement of the couch in a room that was determined based on the contextual information. For example, the simulated scenario may include the couch in a living room in a cabin in the winter.

The digital twin application 107 controls behavior of the 3D digital twins in the simulation scenario based on the contextual information. For example, where the simulated scenario is an advertisement, the simulation scenario may appear similar to information associated with the request, such a cabin in the winter where snow is falling outside where the snow behaves according to the rules generated by a physics engine.

In some embodiments, one or more virtual sensors associated with the digital twin application 107 generate digital media based on the simulation scenario. For example, a virtual camera may capture a digital image of the cabin in the winter. In another example, a virtual video recorder may capture a video clip of the cabin in the winter with the snow falling outside.

The digital twin application 107 may transmit packets containing the digital media bytes to the media server 101. The media server 101 may generate a link of the newly generated digital media and transmit to the link to the web client 103, which displays the media referenced in the link.

In the illustrated embodiment, the entities of the environment 100 are communicatively coupled via a network 102. The network 102 may include any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), file transfer protocol (FTP), and User Datagram Protocol (UDP). Data exchanged over the network 102 may be represented using any suitable format, such as hypertext markup language (HTML) or extensible markup language (XML). In some embodiments, all or some of the communication links of the network 102 may be encrypted using any suitable techniques.

Computing Device Example 200

Figure 2:
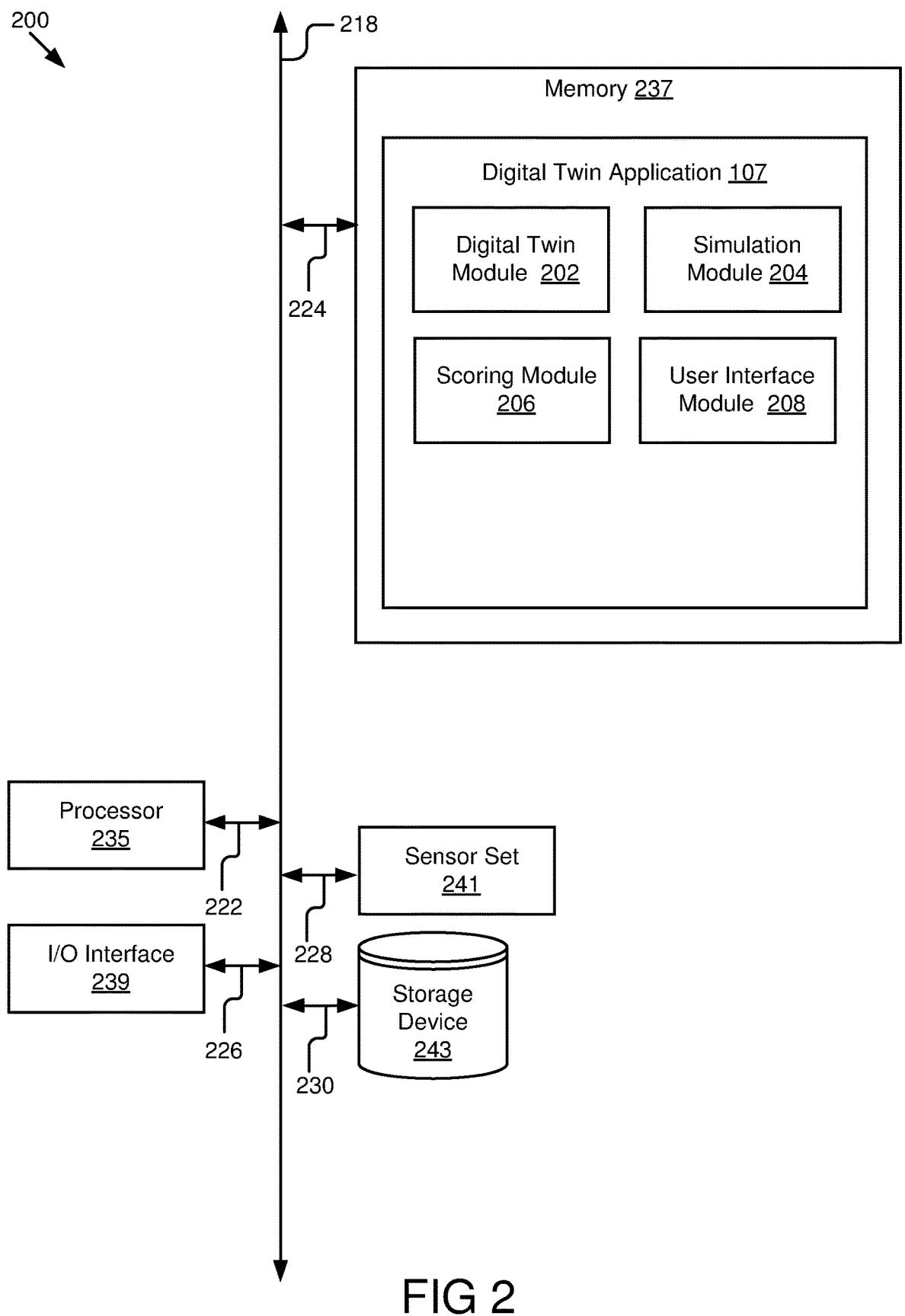
FIG. 2 is a block diagram of an example computing device to generate a simulation scenario according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the rendering server 120. In some embodiments, the computing device 200 is the client device 110.

In some embodiments, computing device 200 includes a processor 235, a memory 237, an Input/Output (I/O) interface 239, a sensor set 241, and a storage device 243. In some embodiments, the computing device 200 includes additional components not illustrated in FIG. 2, such as a display, speakers, a microphone, etc.

The processor 235 may be coupled to a bus 218 via signal line 222, the memory 237 may be coupled to the bus 218 via signal line 224, the I/O interface 239 may be coupled to the bus 218 via signal line 226, the sensor set 241 may be coupled to the bus 218 via signal line 228, and the storage device 243 may be coupled to the bus 218 via signal line 230.

The processor 235 includes an arithmetic logic unit, a microprocessor, a general-purpose controller, or some other processor array to perform computations and provide instructions to a display device. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the digital twin application 107, which is described in greater detail below.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 243), and input/output devices can communicate via I/O interface 239. In another example, the I/O interface 239 can receive data from the media server 101 and deliver the data to the digital twin application 107 and components of the digital twin application 107. In some embodiments, the I/O interface 239 can connect to interface devices such as input devices (keyboard, microphone, sensors, etc.) and/or output devices (display, speaker, etc.).

The sensor set 241 includes sensors that are used to generate digital twins. The sensors may include audio sensors (e.g., including sensors that detect audio frequencies that are undetectable to a human ear), image sensors (e.g., a Red Blue Green (RBG) sensor), ultrasound devices, light detection and ranging (LiDAR), a depth sensor, a 3D sensor, a laser altimeter, a navigation sensor, an infrared sensor, a motion detector, a thermostat, a mass air flow sensor, a blind-spot meter, a curb feeler, a torque sensor, a turbine speed sensor, a variable reluctance sensor, a vehicle speed sensor, a water sensor, a wheel speed sensor, etc. The sensors may be part of the rendering server 120 or strategically placed in an environment and communicatively coupled to the rendering server 120. The sensors in the sensor set 241 may be used to capture images and other sensor data that are used to generate a set of 3D digital twins and elements for the simulation scenarios.

In some embodiments, the sensor set 241 includes virtual sensors that are used to generate digital media. For example, the virtual sensors may include a virtual camera, a virtual video recorder, a virtual LiDAR, etc. to generate digital media based on the simulation scenario.

The storage device 243 may be a non-transitory computer readable memory. The storage device 243 may store data associated with the digital twin application 107, such as properties, characteristics, appearance, and logic representative of and governing assets and entities in a virtual simulation scenario (such as people, animals, inanimate objects, buildings, vehicles, etc.) and materials (such as surfaces, ground materials etc.) for use in generating the simulation scenario. Accordingly, when the digital twin application 107 generates a simulation scenario, an asset selected for inclusion in the simulation scenario (such as a bag of potato chips) can be accessed from the storage device 243 and included within the simulation scenario, and all the properties, characteristics, appearance, and logic for the selected asset can succinctly be instantiated in conjunction with the selected asset.

Example Digital Twin Application 107

FIG. 2 illustrates a computing device 200 that executes an example digital twin application 107 that includes one or more digital twin modules 202, a simulation module 204, a scoring module 206, and a user interface module 208. Although the components of the digital twin application 107 are illustrated as being part of the same digital twin application 107, persons of ordinary skill in the art will recognize that the components may be implemented by different computing devices 200. For example, the digital twin modules 202 may be stored on multiple rendering servers 120.

The digital twin module 202 generates digital twins of assets, entities, and environments. In some embodiments, the digital twin module 202 receives real sensor data or simulated sensor data about physical objects and generates 3D digital twins of corresponding assets, entities, and environments. For example, physical objects may include products (soda, vehicles, houses, etc.), physical items used to provide information (e.g., a ball is used to illustrate the concept of gravity), etc. The data about physical objects includes any real or simulated sensor data that describes the real-world object as well as the environment.

Assets are passive objects, such as an apple, a package of cookies, etc. Entities are objects that have locomotion and/or autonomy, such as a human moving in a room, a robotic system, a human operated system, a mechanical toy, etc. Entities act on assets, such as when a person picks up an object. The environment is the space that the entities and assets are in. In some embodiments, a 3D digital twin of an asset is called an item twin, a 3D digital twin of an entity is called a system twin, and a 3D digital twin of an environment is called a space twin.

The digital twin module 202 may receive sensor data from one or more sensors in the sensor set 241 and generate the 3D digital twins. For example, an image sensor (e.g., an RGB sensor) may provide images including different angles of a physical object and a digital twin module 202 uses the images to generate a 3D asset digital twin that is a volumetric model of the physical item.

In some embodiments, the digital twin module 202 stores the 3D digital twins in the storage device 243 for future retrieval. In some embodiments, the digital twin module 202 indexes the 3D digital twins with asset identifiers, which are unique identifiers to identify the assets in the storage device 243.

In some embodiments, the digital twin module 202 receives the request for generating a simulation scenario or digital media and selects the 3D digital twins based on contextual information. For example, the contextual information includes a list of different assets and entities to be included in the simulated scenario. The digital twin module 202 may select the 3D digital twins by retrieving the 3D digital twins from the storage device 243 or generate the 3D digital twins based on the contextual information. In some embodiments, the digital twin module 202 may retrieve a 3D digital twin and modify the 3D digital twin based on the contextual information. For example, the contextual information may include instructions for generating a woman wearing a blue dress and a necklace. The digital twin module 202 may retrieve a woman, a red dress, and a necklace, and modify the red dress to be blue.

In some embodiments, the digital twin module 202 receives a request with contextual information that includes one or more asset identifiers that correspond to the one or more assets or one or more 3D digital twins. The digital twin module 202 may determine the one or more 3D digital twins that correspond to the one or more assets. For example, the digital twin module 202 may retrieve the one or more 3D digital twins from the storage device 243 by using the one or more asset identifiers to identify matches in the storage device 243.

The simulation module 204 may instantiate and generate a simulation scenario that includes one or more 3D digital twins that correspond to the one or more assets, one or more assets, and an environment based on contextual information from the request.

As used herein, "simulation scenario" refers to a computer-readable data representation of a real-world scenario. The simulation scenario includes 3D digital twin assets and entities within a 3D digital twin environment and includes a set of property and interaction rules that govern characteristics of the assets and entities within the environment and interactions between the objects. In some embodiments, the simulated scenario includes multiple robotics systems (e.g., autonomous vehicle), human operated systems (e.g., drones), and simulated entities (e.g., mechanical toy). In some embodiments, the simulation scenario is a realistic (e.g., photo-realistic, spatial-realistic, sensor-realistic, etc.) representation of a real-world location.

In some embodiments, the simulation module 204 tracks a position of each asset and entity within the simulation scenario. For example, the simulation scenario may be defined as a three-dimensional world with x, y, and z coordinates where z is indicative of altitude.

The simulation module 204 may include a graphics engine configured to generate two-dimensional or three-dimensional graphical data for displaying the simulation scenario. The graphics engine can, using one or more graphics processing units, generate the two-dimensional or three-dimensional graphics depicting the simulation scenario, using techniques including three-dimensional structure generation, surface rendering, shading, ray tracing, ray casting, texture mapping, bump mapping, lighting, rasterization, etc. In some embodiments, the graphics engine can, using one or more processing units, generate representations of other aspects of the simulation scenario, such as audio waves within the simulation scenario.

The simulation module 204 may include a physics engine configured to generate and implement a set of property and interaction rules within the simulation scenario. In practice, the physics engine implements a set of property and interaction rules that mimic reality. The set of property rules can describe one or more physical characteristics of objects within the simulation scenario, such as characteristics of materials the assets and entities are made of (e.g., weight, mass, rigidity, malleability, flexibility, temperature, etc.). Likewise, the set of interaction rules can describe how one or more assets and objects interact (for instance, describing how an entity moves in the air, on land or underwater; describing a relative motion of a first entity to a second entity; a coupling between assets; friction between surfaces of assets, etc.). In some embodiments, the physics engine implements rules about the position of assets and entities, such as maintaining consistency in distances between users. The physics engine can simulate rigid body dynamics, collision detection, soft body dynamics, fluid dynamics, particle dynamics, etc.

The simulation module 204 may include sound engines to produce audio representative of the simulation scenario (such as audio representative of assets and entities within the simulation scenario, representative of interactions between assets and entities within the simulation scenario, and representative of ambient or background noise within the simulation scenario). Likewise, the simulation module 204 can include one or more logic engines that implement rules governing a behavior of objects within the simulation scenario (such as a behavior of people, animals, vehicles, or other objects generated within the simulation scenario that are controlled by the simulation module 204 and that aren't controlled by users).

The simulation module 204 generates a simulation scenario that may include one or more ground surfaces, materials, or substances (such as gravel, dirt, concrete, asphalt, grass, sand, water, etc.). The ground surfaces can include roads, paths, sidewalks, beaches, etc. The simulation scenario can also include buildings, houses, stores, restaurants, and other structures. In addition, the simulation module 204 can include plant life, such as trees, bushes, vines, flowers, etc. The simulation scenario can include various objects, such as furniture, benches, picnic tables, tents, stop signs, crosswalks, rocks, and any other asset found in real life. The simulation scenario can include representations of particular location types, such as mountain locations, farmland and forest in rural areas, city blocks in dense urban sprawls, residential neighborhoods in suburban locations, construction sites, lakes and rivers, bridges, tunnels, playgrounds, parks, etc. In addition, the simulation scenario can include representations of various weather conditions, temperature conditions, atmospheric conditions, etc., each of which can, in an approximation of reality, affect the movement and behavior of avatars.

The simulation module 204 generates a simulation scenario that initializes the 3D digital twins and establishes a spatial relationship between the 3D digital twins based on the contextual information. The contextual information may include a location of an internet protocol (IP) address associated with the request (e.g., a zip code), a time of day of the request, a date of the request, and/or a type of asset. For example, where the type of asset is a bicycle and location of the request is in Utah, the simulation scenario may include a biking trail that is located along the ridge of a mountain or among red rocks. Conversely, where the type of asset is a bicycle and the location of the request is in Florida, the simulation scenario may include a trail that is located along a river in a lush forest. In another example, the simulation module 204 generates a simulation scenario based on the type of asset. For example, a large asset, such as a vehicle is more likely to be paired with an outdoor virtual simulation scenario while a consumer-packaged product such as a cereal box is more likely to be found in an indoor kitchen environment.

The simulation module 204 controls the behavior of the 3D digital twins in the simulation scenario based on the contextual information. For example, the simulation module 204 controls the behavior of light based on the contextual information. The time of day of the request may result in the simulation module 204 generating a simulation scenario that reflects the time of day where a morning request results in a simulation scenario with more sunlight, an evening request results in a simulation scenario with a golden-hour glow, a nighttime request results in a simulation scenario that is dark and lit by individual light sources, etc.

In some embodiments, the simulation module 204 generates the simulation scenario based on contextual information where the contextual information includes a location of the request, a time of day of the request, a holiday or an event that will occur within a predetermined amount of time (e.g., a day, a week, a month, etc.) of the date of the request, a season that corresponds to the date of the request, and/or popular search terms provided by people in the location of the request. For example, the simulation module 204 may generate a simulation scenario when the fourth of July is approaching that includes an outdoor scene because it is summer, with a picnic table that includes a red-checkered tablecloth, beads of condensation that form on a can of soda, etc. In another example, the simulation module 204 may use popular search terms to include a recent trend or meme into the simulation scenario, such as a reference to a video challenge, a prank, an argument about how color is perceived on a dress, a picture of objects on fire with the caption "This is fine," etc. Because the simulation module 204 generates a real-time simulation scenario, the simulation scenario may advantageously reflect the recency of certain trends, which makes the simulation scenario more engaging to users.

In some embodiments, the simulation module 204 combines the 3D digital twins with the simulation scenario based on an artistic style. For example, if the simulation module 204 generates the simulation scenario based on a Salvador Dali style, the 3D digital twins may be located in unconventional locations, such as a soda can with the liquid resembling Dali's melting clocks with the liquid melting off a table. In another example, the simulation module 204 may generate the simulation scenario to have an artistic style similar to a filmmaker that films around the same location as the location in the request, such as generating a simulation scenario with dense green forests and hills in New Zealand that is similar in style to a filmmaker that creates movies located in New Zealand.

In some embodiments, the artistic style may be based on contextual information from the request, such as a type of asset, a location of the IP address associated with the request, an event that will occur within a predetermined amount of time of the date of the request, a holiday that will occur within a predetermined amount of time of the date of the request, and/or a season that corresponds to the date of the request. For example, the simulation module 204 may generate the simulation scenario with the one or more 3D asset digital twin to have a style full of pastel colors because the date of the request is within two weeks of Easter. In another example, the simulation module 204 may generate the simulation scenario with a particular style based on a nearby art museum having a show featuring the artist on which the particular style is based.

In some embodiments, the simulation module 204 generates the simulation scenario based on contextual information that includes a browsing history associated with the user. For example, a user may have recent searches for jewelry that, with user consent, the simulation module 204 uses to generate a simulation scenario with different people wearing different pieces of jewelry along with different outfits, hairstyles, backgrounds, etc.

In some embodiments, the user may create a user profile and provide consent for the use of certain information about the user, such as the user's gender, eye color, skin tone, haircut, etc. that is used to generate the simulation scenario. In some embodiments, the user may upload an image of the user that is used by the simulation module 204 to generate a simulation scenario of the user wearing different products, such as clothing, jewelry, etc. In some embodiments, the user profile may be for other objects, such as for a user that is researching how to decorate their house and where the user may list different products that they are looking to buy. For example, the user may express an interest in purchasing silver appliances for a mid-century modern kitchen and the simulation module 204 may generate a simulation scenario in the style preferred by the user that helps the user make purchasing decisions about the type of appliances that the user wants to purchase.

In some embodiments, the simulation module 204 uses multiple sensors to generate simulation scenarios based on the type of sensor data received from the sensor set 241. For example, a first simulation scenario may be based on a RBG sensor capturing images, a second simulation scenario may be based on LiDAR providing depth information and a system twin sensor that generates an augmented version of the simulation scenario, and a third simulation scenario may be generated from physical environmental properties, such as ground elevation, vegetation maps, and climate data for an outdoor simulation scenario. In some embodiments, the simulation module 204 combines the sensor data to generate a simulation scenario that is a combination of sensor data different types of sensors, such as the sensor data from LiDAR and sensor data used to create an augmented simulation scenario as mentioned above.

In some embodiments, the simulation module 204 tests a robotic system. For example, the robotic system may be a drone or an autonomous system, such as an autonomous vehicle. The simulation scenario may include a corresponding digital twin of the robotic system in the environment that predicts behavior of the robotic system in a real-world environment. For example, the simulation scenario may present the robotic system (a drone) with different scenarios, such as contextual information that includes a simulation of a particular location (Death Valley) and a particular task (inspecting the integrity of solar panels using machine learning). In some embodiments, robotic system is an autonomous system (e.g., an autonomous vehicle) and the contextual information includes sensor data of a real-world event that occurred involving the autonomous system (e.g., a video of an accident). The simulation module 204 may generate the simulation scenario as a way for users to analyze different factors that caused the real-world event to occur (e.g., look at the position of pedestrians and the autonomous vehicle's reaction time).

Figure 3:
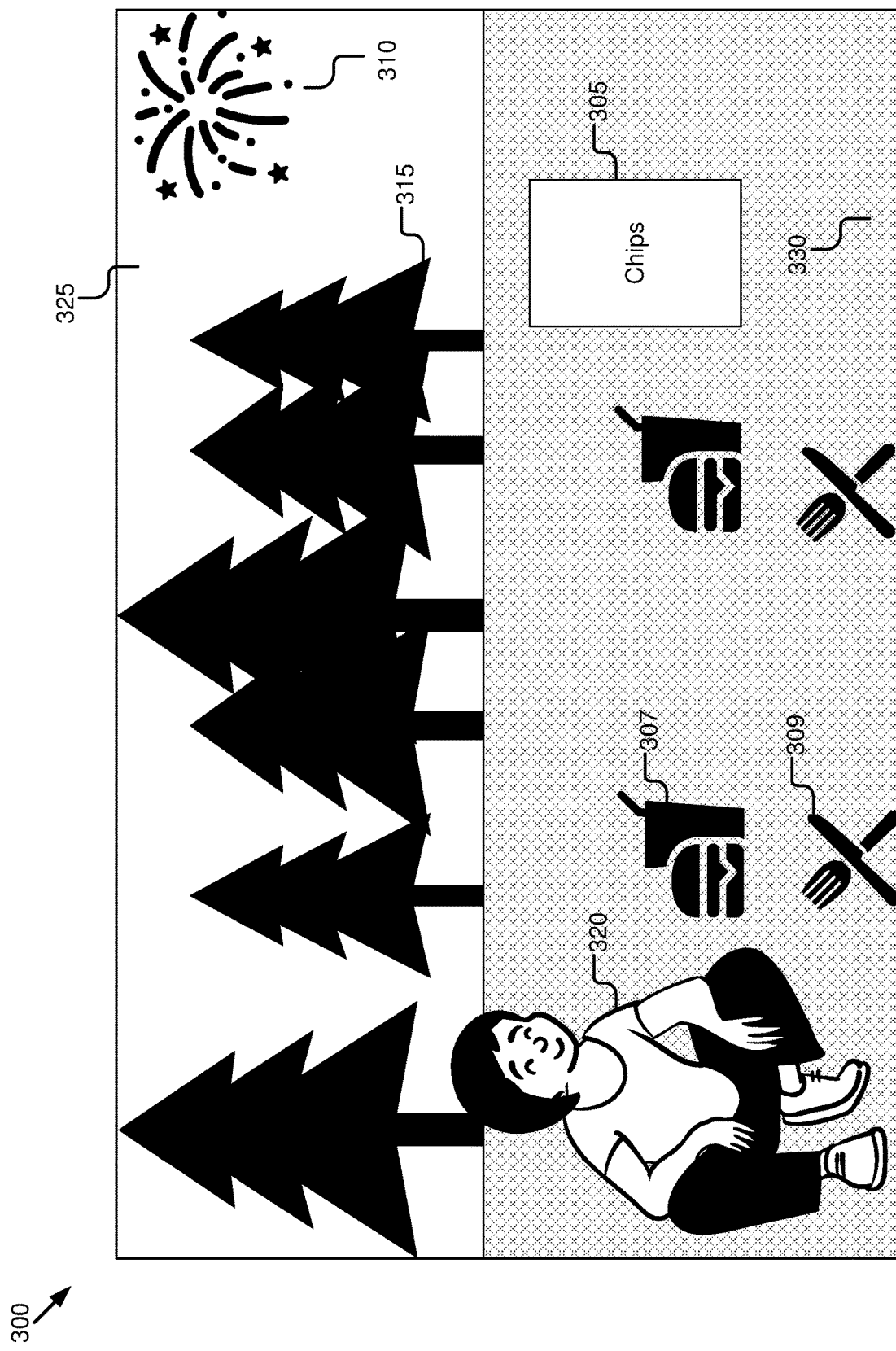
FIG. 3 illustrates an example simulation scenario, according to some embodiments described herein.

Turning to FIG. 3, an example simulation scenario 300 is illustrated. In this example, the digital twin module 202 generates the chips 305 as a 3D digital twin and stores the chips 305 in the storage device 243. The simulation module 204 selects 3D digital twins based on contextual information in the request. Specifically, the simulation module 204 selects the 3D digital twins corresponding to the chips 305, the food 307 (e.g., each burger, each soda), the silverware 309 (e.g., each fork, each knife), the fireworks 310, the trees 315 (stored either as separate digital twins for each object or as a single digital twin for the environment), the person 320, the sky 325, and the ground 330. In some embodiments, the chips 304, the food 307, the silverware 309, and the trees 315 are item twins that correspond to assets; the fireworks 310 are system twins because they correspond to moving entities (e.g., because the fireworks have physical dynamics); and the sky 325 and the ground 330 are a space twin that correspond to the environment. In some embodiments, if the trees 315 are not going to repositioned within the simulation scenario, the trees 315 may also become part of the environment.

In some embodiments, the contextual information used to select the 3D digital twins may include a location of the IP address associated with the request, which may inform the location of the simulation scenario. For example, the simulation scenario includes an outdoor area with trees that are specific to that area, a picnic setting because chips are often eaten at picnics, burgers and soda because chips are often eaten with burgers and sodas, and fireworks because the request was made within the predetermined amount of time before July $4^{th}$.

The simulation module 204 generates the simulation scenario that initializes the 3D digital twins and establishes a spatial relationship between the 3D digital twins based on the contextual information. For example, the trees 315 are placed in the background, the chips 305 are placed with the food 307, and the fireworks 310 are placed in the sky.

The simulation module 204 controls behavior of the 3D digital twins in the simulation scenario based on the contextual information. For example, the light designed to behave according to evening light because the simulation scenario is an outdoor scene where fireworks are visible. The fireworks behave according to physics principles and move based on gravity.

In some embodiments, the simulation module 204 may include a machine-learning model that is trained to output a simulation scenario based on the contextual information. In some embodiments, the machine-learning model is trained with a training set that includes example scenarios from the real world that include entities, assets, and environments as well as annotated context information that correspond to one or more digital twins available to the digital twin module 202. The machine-learning model is used by the simulation module 204 to make an association between contextual information and corresponding simulation scenarios based on the contextual information, such as a particular location, time of day, holiday, event, season, type of asset, etc. For example, a training set may include scenarios with Christmas holiday labels and the machine-learning model may then learn to produce simulation scenarios that include an environment digital twin with other digital twins associated with Christmas, such as a Christmas tree, presents, stockings, etc. The machine-learning model may also specify in the simulation scenario the typical spatial positions and relationships of these Christmas themed digital twins within the virtual environment.

In some embodiments, a simulated scenario may be used to produce synthetic training data for a machine-learning model. For example, a scripted prompt may include a request for a simulated scenario where a drone generates sensor data from flying over a semi-arid area that includes a solar farm. In some embodiments, the scripted prompt may be so specific that it includes the number of segments in each solar panel and the simulation module 204 generates a corresponding 3D digital twin. In some embodiments, the scripted prompt include a request for a simulation scenario with solar panels and the simulation module 204 generates a corresponding 3D digital twin that satisfies the scripted prompt.

In some embodiments, the simulation module 204 trains the machine-learning model using the training dataset in an unsupervised learning fashion. In some embodiments, the machine-learning model is a large language model (LLM) consisting of a neural network with parameters that are trained on an unlabeled training dataset, such as text from scripted prompts and digital media of simulated scenarios using self-supervised learning.

A neural network uses multiple layers to progressively extract higher-level features from the raw input where the input to the layers are the scripted prompt, the one or more 3D digital twins, and a training set of annotated scenarios. The outputs are simulated scenarios that include 3D digital twins for the assets, the entities, and an environment, where the simulated scenarios are based on the contextual information.

The simulation module 204 may implement machine learning model layers that identify increasingly more detailed features and patterns within the simulation scenarios from the training sets where the output of one layer serves as input to a subsequently more detailed layer until a final output is a simulation scenario based on the contextual information.

In some embodiments, the LLM is trained to recognize different associations between words that are used to generate 3D digital twins for different scenarios. For example, a request may include contextual information for cereal. The storage device 243 includes a particular brand of cereal (e.g., Crunchy A's). In some embodiments, the LLM is trained to recognize that Crunchy A's are a type of cereal that would satisfy the request. As a result, the LLM advantageously avoids the need to have a catalog of digital twins for every version of a request.

In some embodiments, the simulation module 204 includes multiple machine-learning models. A first machine-learning model may receive as input the scripted prompt and one or more 3D digital twins and output the simulation scenario. A second machine-learning model may receive the simulation scenario or digital media and style-reference media as input and output stylized digital media that blends the simulation scenario or digital media with the style-reference media. In some embodiments, the first machine-learning model is an LLM and the second machine-learning model is a style transfer machine-learning model.

In some embodiments, the machine-learning model includes a style transfer machine-learning model. The style transfer machine-learning model optimizes style-reference media to match the content statistics of the simulation scenario or digital media and the style statistics of the style-reference media. For example, the artistic styles mentioned above may be implemented by the neural style transfer. In some embodiments, the artistic style may be a photography style, a painting style, a video style, etc. For example, the neural style transfer may output stylized digital media that reflects the digital media in a style of an image that was captured with a fish-eye lens, a video that was captured in the black-and-white dustbowl style of *Dorothea Lange*, an image that is modified to look like an Impressionist painting, etc.

In some embodiments, the statistics are extracts from the simulation scenario and the style-reference image using a convolutional network. The convolutional network is a machine-learning model that includes machine learning model layers that are used to get the content and style representations of the image.

The convolutional network identifies increasingly more detailed features and patterns within the simulation scenario and the style-reference image. The first few layers represent low-level features like edges and textures. The final few layers represent higher-level features, such as tables or eyes until a final output is the stylized simulation scenario.

In some embodiments, the simulation module 204 may implement a machine-learning model that outputs different simulation scenarios. For example, the machine-learning model may output a selection of different digital twin models for generating a static simulation scenario, a simulation scenario for a video, and a simulation scenario that is part of an interactive scene where a user may move objects within the simulation scenario.

In some embodiments, a scoring module 206 scores different simulation scenarios with 3D digital twins that correspond to the one or more assets, entities, and an environment. For example, the simulation module 204 may generate a first simulation scenario based on a camping scene in the mountains, a second simulation scenario based on a Halloween theme, and a third simulation scenario based on a Van Gough painting style. The scoring module 206 may select the simulation scenario with the highest score (or the lowest score depending on what the score represents) to be selected for display to a user based on adherence of the simulation scenarios to the contextual information.

The user interface module 208 generates graphical data for displaying a user interface. In some embodiments, the user interface includes options for the user to configure different aspects of the simulation scenario. For example, the user interface may include an option for defining certain features, such as the predetermined amount of time of the date of the request. In some embodiments, the user interface includes options for obtaining user consent for using information about the user and for the user to provide information that the user wants to be part of any customization. For example, the user interface may include an option for the user to consent to customized media based on user preferences, browsing history, etc. The digital twin application 107 does not customize the media based on user information without user content.

Example Architectures

Figure 4:
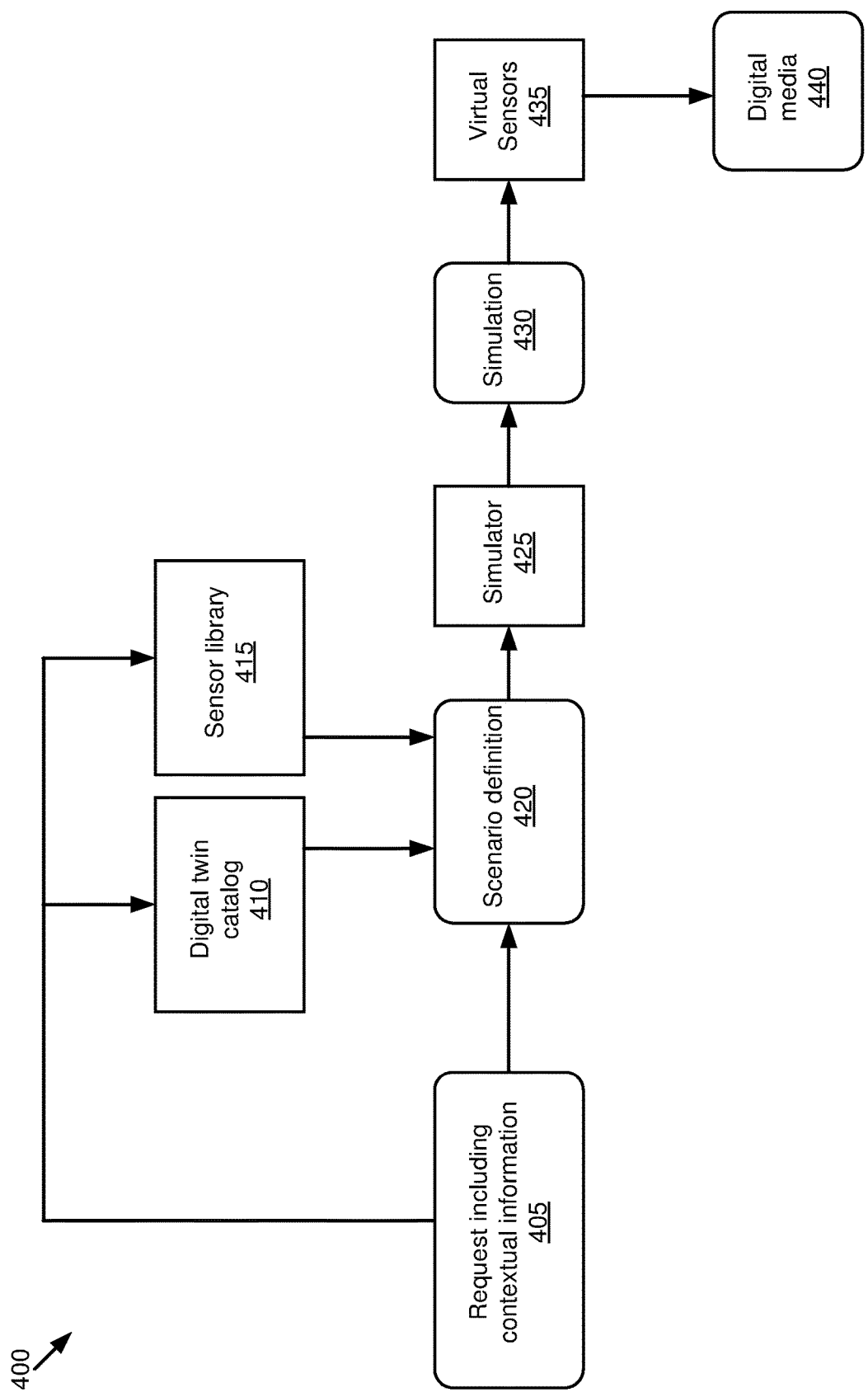
FIG. 4 is an example block diagram of an architecture for generating a simulation scenario according to some embodiments described herein.

FIG. 4 is an example block diagram 400 of an architecture for generating a simulation scenario. In some embodiments, the block diagram 400 includes a request including contextual information 405, a digital twin catalog 410, a sensor library 415, a scenario definition 420, a simulator 425, a simulation 430, virtual sensors 435, and digital media 440.

The contextual information in the request 405 is used by a machine-learning model (e.g., an LLM) to select digital twins from the digital twin catalog 410 and sensors from the sensor library 415. The digital twins and the sensor library are used along with the contextual information to create a scenario definition 420. The scenario definition 420 is provided to the simulator 425, which outputs a simulation 430. The simulation 430 is provided to the virtual sensors 435 to generate digital media 440.

Figure 5:
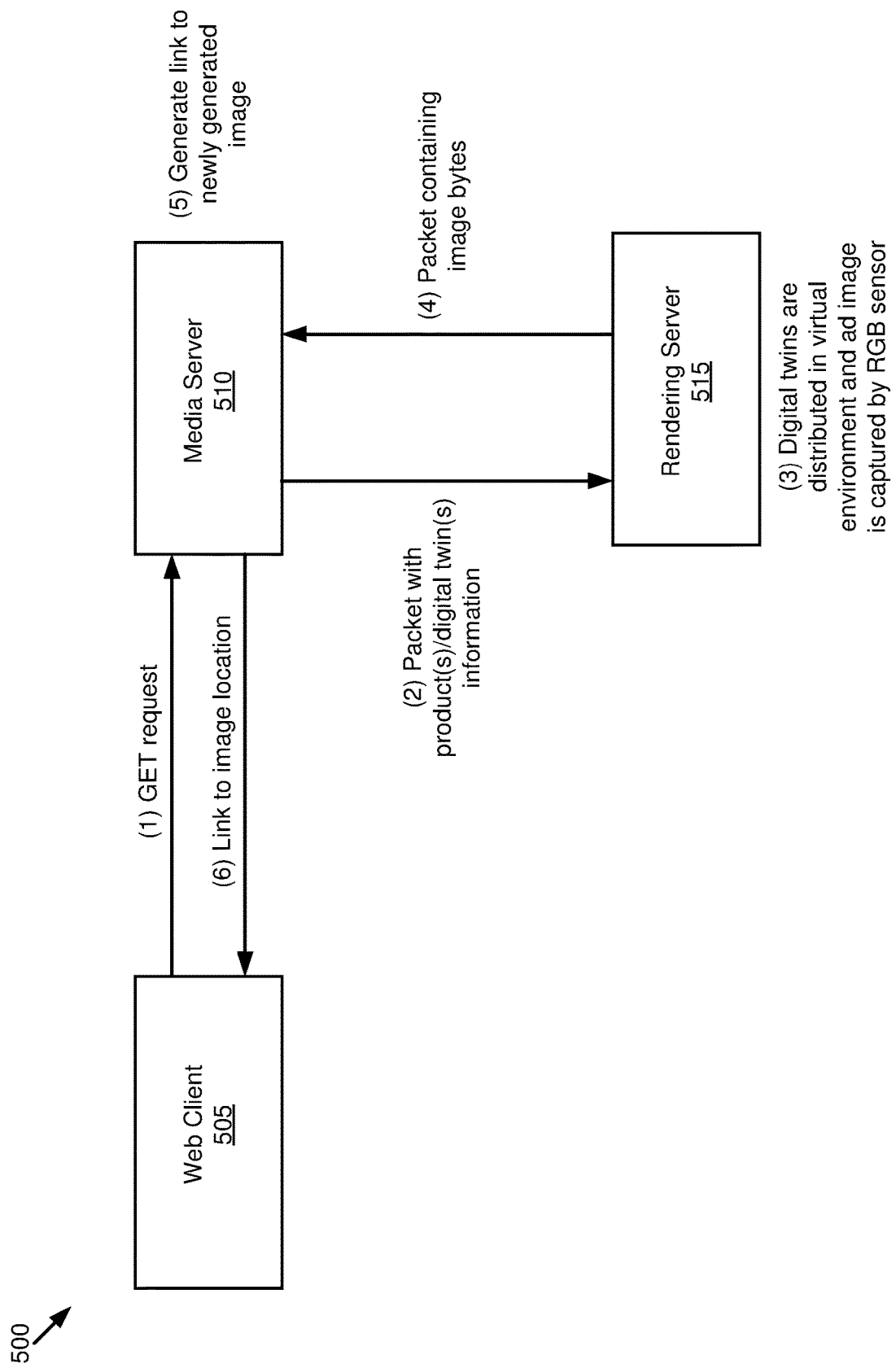
FIG. 5 is an example block diagram of an architecture for generating digital media according to some embodiments described herein.

FIG. 5 is an example block diagram 500 of an architecture for generating digital media. The architecture includes a web client 505, a media server 510, and a rendering server 515.

The web client 505 represents any service where the web client 505 can initiate a GET request, such as a web browser. The request may include identifying information for products or digital twins, such as an asset ID number and/or a string representation. The GET request is sent to the media server 510.

The media server 510 receives the GET request from the web client 505 and creates a packet containing one or more asset/digital twin identifiers based on the data contained in the GET request. Packet identifying information may be in an integer format. The media server 510 establishes a connection with the rendering server 515 and sends the packet over a standard networking protocol, such as transmission control protocol (TCP)/IP.

The media server 510 waits for a response from the rendering server 515, which may be in the form of a byte stream. The rendering server 515 generates a link-path to the media location in the media server 510 that can be accessed publicly. The link is returned to the web client 505.

On an incoming packet, the rendering server 515 spawns the 3D digital asset twins in a specified simulation scenario. The position of the virtual assets within the simulation scenario can be directed artistically or generated procedurally with the optional use of physics. The rendering server 515 captures digital media, such as an image, of the simulation scenario using a digital sensor (e.g., an RGB sensor) and produces a byte stream to be sent over the preexisting connection with the media server 510 on a standard network protocol. After sending the packet, the media server 510 will wait for the next incoming packet.

Example Method 600

FIG. 6 is an example flow diagram of a method 600 to generate media. In some embodiments, the method 600 is performed by the rendering server 120 in FIG. 1. In some embodiments, the method 600 is performed by the computing device 200 in FIG. 2. The method 600 may begin with block 602.

At block 602, a request for generating a simulation scenario or digital media is received that includes one or more entities and one or more assets in an environment, the request including context information. Block 602 may be followed by block 604.

At block 604, 3D digital twins are selected based on the contextual information, where one or more of the 3D digital twins correspond to the assets, one or more of the digital twins correspond to the one or more entities, and one of the 3D digital twins corresponds to the environment. The contextual information may include a location of an IP address associated with the request, a time of day of the request, a type of asset, and/or a date of the request. In some embodiments, the request includes a scripted prompt that describes the contextual information, where the contextual information may include details of a particular simulated scenario. Block 604 may be followed by block 606.

At block 606, the simulated scenario is generated that initializes the 3D digital twins and establishes a spatial relationship between the 3D digital twins based on the contextual information. For example, the 3D digital twins for entities and assets are placed in particular locations in the simulated scenario based on their attributes. Block 606 may be followed by block 608.

At block 608, behavior of the 3D digital twins in the simulation scenario is controlled based on the contextual information. For example, if the 3D digital twins for entities move in the scenario, their movement is a type of behavior that is based on the contextual information.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

Various embodiments described herein include obtaining data from various sensors in a physical environment, analyzing such data, generating recommendations, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., client device only; client+server device; etc.) and where the data analysis is performed (e.g., client device only; client+server device; etc.). Data are utilized for the specific purposes as described herein. No data is shared with third parties without express user permission.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
performing by one or more processors, operations including:
receiving a request for generating a simulation scenario or digital media that includes one or more entities and one or more assets in an environment, the request including contextual information;
selecting three-dimensional (3D) digital twins based on the contextual information, wherein one or more of the 3D digital twins correspond to the assets, one or more of the 3D digital twins correspond to the one or more entities, and one of the 3D digital twins corresponds to the environment;
generating the simulation scenario that initializes the 3D digital twins and establishes a spatial relationship between the 3D digital twins based on the contextual information; and
controlling behavior of the 3D digital twins in the simulation scenario based on the contextual information.

2. The method of claim 1, further comprising:
generating, with one or more virtual sensors, the digital media based on the simulation scenario.

3. The method of claim 2, further comprising:
providing the digital media and style reference media as input to a style transfer machine-learning model; and
outputting, with the style transfer machine-learning model, stylized digital media that reflects the digital media in a style of the style reference media.

4. The method of claim 2, wherein the assets are products, the digital media is a digital media advertisement and further comprising:
providing a link of the digital media advertisement to a web client.

5. The method of claim 4, wherein the digital media is delivered in real time via a hypertext transfer protocol secure (HTTPS) media request.

6. The method of claim 1, wherein the request includes a scripted prompt that describes the contextual information and further comprising:
providing the scripted prompt as input to a large language model (LLM); and
outputting, with the LLM, the simulation scenario based on the contextual information in the scripted prompt.

7. The method of claim 1, further comprising:
providing training set data from the simulated scenario that includes the contextual information to a machine-learning model; and
training the machine-learning model based on the training set data to output additional simulated scenarios based on receiving other contextual information as input.

8. The method of claim 1, wherein the request for generating the simulation scenario is for testing a robotic system and the simulation scenario includes a corresponding digital twin of the robotic system in the digital twin of the environment that predicts behavior of the robotic system in a real-world environment.

9. The method of claim 8, wherein the robotic system is an autonomous system and the contextual information includes sensor data of a real-world event that occurred involving the autonomous system.

10. The method of claim 8, wherein the simulation scenario includes multiple robotics systems, human operated systems, and simulated entities in a coordinated workflow or process.

11. A device comprising:
one or more processors; and
a memory coupled to the one or more processors, with instructions stored thereon that, when executed by the processor, cause the processor to perform operations comprising:
receiving a request for generating a simulation scenario or digital media that includes one or more entities and one or more assets in an environment, the request including contextual information;
selecting three-dimensional (3D) digital twins based on the contextual information, wherein one or more of the 3D digital twins correspond to the assets, one or more of the 3D digital twins correspond to the one or more entities, and one of the 3D digital twins corresponds to the environment;
generating the simulation scenario that initializes the 3D digital twins and establishes a spatial relationship between the 3D digital twins based on the contextual information; and controlling behavior of the 3D digital twins in the simulation scenario based on the contextual information.

12. The device of claim 11, wherein the operations further comprise:
generating, with one or more virtual sensors, the digital media based on the simulation scenario.

13. The device of claim 12, wherein the operations further comprise:
providing the digital media and style reference media as input to a style transfer machine-learning model; and
outputting, with the style transfer machine-learning model, stylized digital media that reflects the digital media in a style of the style reference media.

14. The device of claim 12, wherein the assets are products, the digital media is a digital media advertisement, and the operations further comprise:
providing a link of the digital media advertisement to a web client.

15. The device of claim 14, wherein the digital media is delivered in real time via a hypertext transfer protocol secure (HTTPS) media request.

16. A non-transitory computer-readable medium with instructions stored thereon that, when executed by one or more computers, cause the one or more computers to perform operations, the operations comprising:
receiving a request for generating a simulation scenario or digital media that includes one or more entities and one or more assets in an environment, the request including contextual information;
selecting three-dimensional (3D) digital twins based on the contextual information, wherein one or more of the 3D digital twins correspond to the assets, one or more of the 3D digital twins correspond to the one or more entities, and one of the 3D digital twins corresponds to the environment;
generating the simulation scenario that initializes the 3D digital twins and establishes a spatial relationship between the 3D digital twins based on the contextual information; and
controlling behavior of the 3D digital twins in the simulation scenario based on the contextual information.

17. The computer-readable medium of claim 16, wherein the operations further comprise:
generating, with one or more virtual sensors, the digital media based on the simulation scenario.

18. The computer-readable medium of claim 17, wherein the operations further comprise: providing the digital media and style reference media as input to a style transfer machine-learning model; and
outputting, with the style transfer machine-learning model, stylized digital media that reflects the digital media in a style of the style reference media.

19. The computer-readable medium of claim 17, wherein the assets are products, the digital media is a digital media advertisement, and the operations further comprise:
providing a link of the digital media advertisement to a web client.

20. The computer-readable medium of claim 19, wherein the digital media is delivered in real time via a hypertext transfer protocol secure (HTTPS) media request.

* * * * *